Aug. 21, 1945.  W. A. FESSLER  2,383,120
PURIFICATION OF SULPHONATED PRODUCTS
Filed Jan. 19, 1942
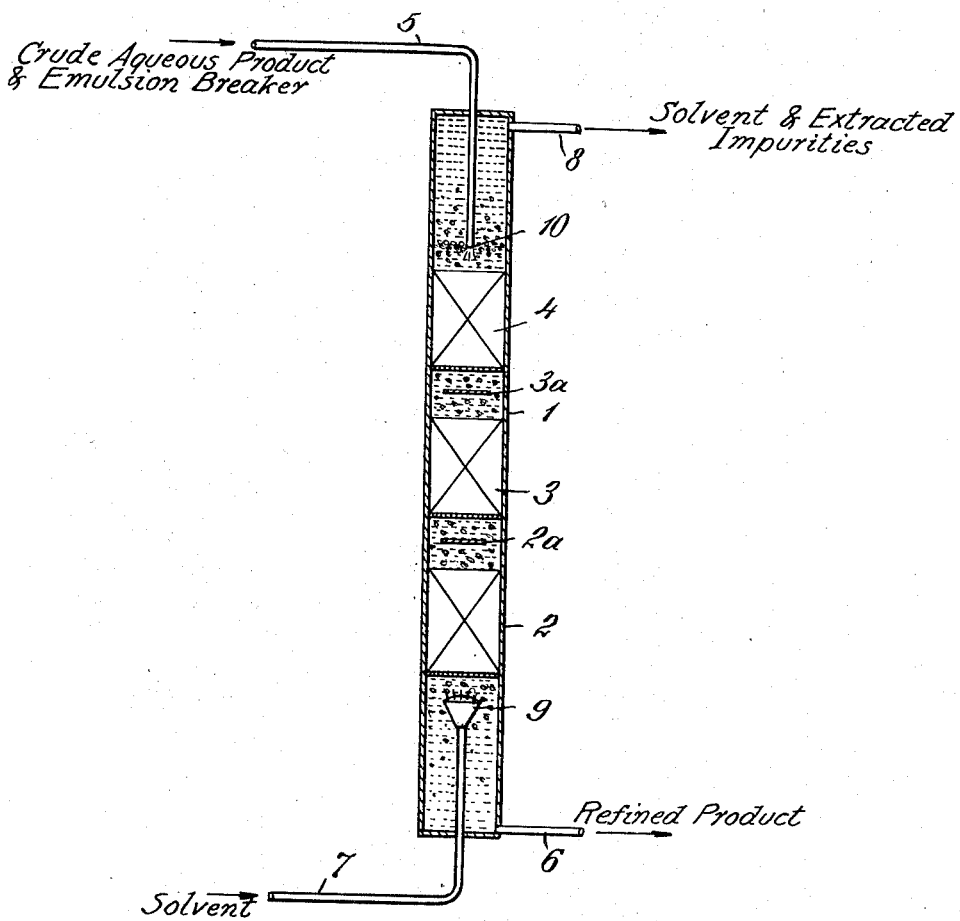
INVENTOR
*William A. Fessler*
BY
*George D. Campbell*
ATTORNEY Patented Aug. 21, 1945

2,383,120

UNITED STATES PATENT OFFICE 2,383,120

PURIFICATION OF SULPHONATED PRODUCTS

William Alfred Fessler, Camillus, N. Y., assignor to The Solvay Process Company, New York, N. Y., a corporation of New York Application January 19, 1942, Serial No. 427,321

9 Claims. (Cl. 260—513)

This invention relates to surface active agents of the nitrosation-sulphitation type and is particularly concerned with a method for purifying such products and augmenting their surface active properties.

In United States Patent 2,265,993 there is described the manufacture of surface active products by forming an addition product of a nitrosyl halide (herein termed a "nitrosyl halide adduct") with an unsaturated aliphatic compound or with mixtures thereof and reacting the addition product with alkali sulphite. The products of this process comprise mixtures of sulphonated ketones, sulphonated amines, sulphonated alkylidene sulphamates, sulphonated alkyl sulphamates, and bisulphite addition products of sulphonated alkylidene sulphamates. The products prepared from olefins containing between 10 and 30 carbon atoms in the molecule and especially the products prepared from such olefins containing at least one straight carbon chain of at least 8 carbon atoms are especially valuable as detergents, wetting agents, dispersing agents, emulsifying agents and the like.

In application Serial No. 424,940 of Leland J. Beckham, filed December 30, 1941, entitled "Derivatives of unsaturated compounds and method of making," there is described the manufacture of surface active products by forming an addition product of a nitrosyl halide (a nitrosyl halide adduct) with a carboxylic-substituted unsaturated hydrocarbon or with mixtures thereof and reacting the addition product with alkali sulphite. The products comprise mixtures of sulphonated, carboxylic-substituted ketones, amines, sulphamates, etc. and possess properties similar to the products prepared from unsubstituted olefins but also exhibit properties characteristic of the carboxylic group. The carboxylic group may be a carboxylic acid group, a carboxylic acid amide group, a carboxylic acid halide group, a carboxylic acid ester group, a carboxylic acid salt group, or a nitrile group. The products prepared from carboxylic-substituted olefins containing between 10 and 30 carbon atoms per olefinic linkage constitute especially satisfactory detergents, etc.

In applications Serial Nos. 424,941, 424,942, and 424,943, of Leland J. Beckham, filed December 30, 1941, improvements are described and claimed relating to the nitrosation and sulphitation steps of the above application Serial No. 424,940 and Patent No. 2,265,993.

Application Serial No. 427,327 of Leland J. Beckham, entitled "Manufacture of organic sulphitation products," filed on the same date herewith, describes and claims the production of sulphitation products by the same general sulphitation procedures as described and claimed in the applications and patent previously referred to, from nitrogen oxide nitrosation products, which form sulphitation products in a manner similar to the nitrosyl halide addition products of the above application Serial No. 424,940 and Patent No. 2,265,993.

The products prepared in the above manner are designated herein "nitrosation-sulphitation products."

The present invention relates to the purification of nitrosation-sulphitation products, and particularly surface active agents prepared by the basic processes and the improvement processes of the applications above enumerated.

In the manufacture of nitrosation-sulphitation products by the above-mentioned procedures there are obtained as sulphitation products aqueous solutions containing the surface active agents in admixture with inorganic salts such as sodium chloride, sodium sulphate, sodium sulphite, sodium bisulphite, and sodium sulphamate. These products also contain as impurities substantial amounts of non-volatile or high-boiling water-insoluble hydrocarbons or carboxylic-substituted hydrocarbons which have not reacted to form water-soluble surface active agents but which, because of the surface active properties of the water-soluble reaction products, are held in a state of solution or suspension in the aqueous phase of the surface active nitrosation-sulphitation product. The aqueous phase may comprise from 25% to 35% or 40% or more (by weight) of organic and inorganic solids present in a ratio between 3:1 and 1:2, and between about 4% and about 10% of non-volatile water-insoluble surface inactive oily organic material. As a typical illustration, a sulphitation product may contain about 6% (by weight) of surface inactive oily organic material, 34% of solids (of which 40% to 55% comprise surface active organic sulphitation products), 15% to 25% sodium sulphate, 10% to 20% sodium sulphite, 6% to 10% sodium bisulphite, 10% to 14% sodium chloride, and 1% to 3% sodium sulphamate.

In accordance with the present invention it has been found that the water-insoluble, surface inactive organic material can be removed from nitrosation-sulphitation products by extracting these products with a non-aromatic hydrocarbon liquid normally boiling between 50° and 150° C., in the presence of an emulsion breaker.

Non-aromatic hydrocarbon liquids suitable as extractants are saturated and unsaturated aliphatic hydrocarbons having boiling points between 50° and 150° C., alicyclic hydrocarbons having such boiling points, and mixtures of aliphatic or alicyclic or aliphatic and alicyclic hydrocarbons with boiling ranges lying between 50° and 150° C. Acyclic hydrocarbons, i. e., alkanes and alkenes, are preferred. Specific examples of such compounds are normal hexane, heptane, and octane, and their isomers, petroleum distillate fractions comprising mixtures of such compounds, and cracked distillates of low aromatic hydrocarbon content and which may contain as much as 90% or more of olefins such as hexenes, heptenes and octenes.

Suitable emulsion breakers are water-soluble alcohols, ketones, and ethers having normal boiling points below 125° C. For operations at atmospheric pressure, compounds boiling not below about 65° C. should be used. Examples of such compounds are methyl alcohol, ethyl alcohol, isopropyl alcohol, tertiary butyl alcohol, methyl ethyl ketone, acetone, and dioxane. Highly water-soluble compounds which normally boil between 75° and 85° C. are preferred.

The proportion of extractant employed may be varied depending upon the degree of extraction it is desired to effect. Thus the volume of extractant may be substantially less than the volume of aqueous mixture being extracted or several times greater.

The proportion of emulsion breaker employed also may be varied to a considerable extent. However, it is advantageous to employ close to the lowest concentration that provides efficient phase separation. This amount may be from about ½% up to about 8% (by weight) depending upon the composition of the aqueous detergent solution. Higher concentrations increase the proportion of extractant liquid dissolved in the aqueous phase and thus increase the amount of extractant liquid as well as emulsion breaker to be separated from the aqueous detergent. Moreover, excessive proportions of emulsion breaker may cause the separation of a third phase. This third phase may be formed with proportions of emulsion breaker varying from as little as 2% to as much as 40% or more by weight of the detergent solution. The formation of a third phase introduces additional complications and hence it is preferred to limit the proportion of alcohol to avoid the formation of a third phase. Normally the most suitable proportion of emulsion breaker will lie between ½% and 8% of the aqueous detergent mixture (by weight).

It is preferred to conduct the extraction at temperatures between 70° C. and 80° C.

In the accompanying drawing I have illustrated diagrammatically apparatus suitable for effecting the refining process of this invention.

This apparatus comprises a tower 1 relatively tall compared to its cross-sectional diameter, provided with a series of packed sections 2, 3, 4, packed with pervious material such as ceramic rings, and intermediate redistributing baffles 2a, 3a, and having an inlet 5 for the crude aqueous nitrosation-sulphitation product, and outlet 6 for the refined product, and inlet 7 for hydrocarbon solvent, and an outlet 8 therefor.

In the apparatus illustrated, the inlet 7 for solvent is provided with a distributing device 9 for breaking up the solvent into a large number of very fine streams. Inlet 5 for the nitrosation-sulphitation product is provided with an open ended pipe as outlet. While this construction has advantages, it is not essential and the inlet 5 may be provided with a distributing device such as distributing device 9 and the inlet 7 may be an open-ended pipe.

The illustrated arrangement is especially suitable for operations employing a continuous aqueous phase extraction bed. In operation of the apparatus to provide a continuous aqueous phase, the flows are controlled to provide an oil aqueous solution interface at about the point of introducing the aqueous solution, designated 10 on the drawing. Below this interface hydrocarbon constitutes the dispersed phase and is present in the form of exceedingly fine droplets surrounded by the continuous aqueous phase. Above this line the body of liquid comprises the hydrocarbon solvent and dissolved extracted oil as the continuous phase containing dispersed droplets of the aqueous product. The portions of the tower above point 10 and below distributor 9 serve as settling chambers to permit phase separation.

By proper adjustment of flows, the interface may be raised or lowered in the column. It is possible, for example, to lower this interface to any desired position between the point 10 and a point in the proximity of distributor 9. When the interface approaches the position of distributor 9, the process is essentially a continuous oil phase extraction with the aqueous solution the dispersed phase. As compared with the continuous aqueous phase operation, this method has the advantage of a higher extraction efficiency but is subject to the disadvantage that the system is relatively less stable and consequently more difficult to control to provide uniform operation.

For operation with the aqueous solution as the dispersed phase, it is obviously of advantage to provide a distributor such as distributor 9 on the inlet 5 to accelerate distribution of the aqueous phase in the body of oil within the extraction zone.

The following examples further illustrate the invention.

*Example 1*

Through a tower 16 ft. high with 8 inch internal diameter packed from the 2.5 ft. level to the 13.5 ft. level with ⅝ inch Raschig ceramic rings was passed countercurrently 27,000 cc./hr. of a paraffinic petroleum solvent of 80° to 95° C. boiling range and 27,000 cc./hr. of an aqueous solution of crude nitrosation sulphitation product, containing by weight 30% solids, 6% oil, 3% 2-propanol and 61% $H_2O$. Solvent was introduced at a point 4 inches below the packing and was drawn off at the top of the column. The aqueous solution was introduced 4 inches above the packing and drawn off at the bottom. The tower was maintained at 70° C. throughout. The aqueous solution drawn off was found to contain only 0.1% non-volatile oil.

*Example 2*

The tower described in Example 1 was kept at 75° C. and a non-aromatic petroleum fraction of 100° to 140° C. boiling range was passed at 30,000 cc./hr. countercurrently to a crude aqueous nitrosation-sulphitation product, containing by weight 31% solids, 4% oil, 2% methyl ethyl ketone and 63% water introduced at 10,000 cc./hr. The purified aqueous solution was found to contain about 0.1% non-volatile oil.

Example 3

The tower described in Example 1 was kept at 50° C. and a non-aromatic petroleum fraction of 100° to 140° C. boiling range was passed at 10,000 cc./hr. countercurrently to an aqueous solution of crude nitrosation-sulphitation product containing by weight 30% solids, 5% dioxane, 4% oil, and 61% water introduced at 10,000 cc./hr. The aqueous solution leaving the base of the tower contained 0.1% non-volatile oil.

The products in each of the above examples contained a few percent of the non-aromatic petroleum oil; this may be substantially completely removed from the aqueous phase by a fractional distillation or stripping step.

I claim:

1. The method of improving an organic nitrosation-sulphitation product which comprises extracting impurities from the nitrosation-sulphitation product in an aqueous phase containing an emulsion breaker of the group consisting of water-soluble alcohols, ketones and ethers, normally boiling below 125° C., with a non-aromatic hydrocarbon liquid normally boiling between 50° and 150° C., the amount of the emulsion breaker being between ½% and 8% by weight of the aqueous nitrosation-sulphitation product.

2. The method of improving an organic nitrosation-sulphitation product containing high-boiling water-insoluble oils, which comprises extracting impurities including high boiling, water-insoluble oils from the nitrosation-sulphitation product in an aqueous phase containing an emulsion breaker of the group consisting of water-soluble alcohols, ketones and ethers, normally boiling between 65° and 125° C., with a non-aromatic hydrocarbon liquid normally boiling between 50° and 150° C., the amount of the emulsion breaker being between ½% and 8% by weight of the aqueous sulphitation product but less than sufficient to create a third liquid phase during the extraction.

3. The method of improving an organic nitrosation-sulphitation product containing high-boiling water-insoluble oils, which comprises extracting impurities including high boiling, water-insoluble oils from the nitrosation-sulphitation product in an aqueous phase containing isopropyl alcohol as an emulsion breaker, with a non-aromatic hydrocarbon liquid normally boiling between 50° and 150° C. the amount of isopropyl alcohol being between ½% and 8% by weight of the aqueous nitrosation sulphitation product.

4. In the manufacture of surface active agents by sulphitation of nitrosyl halide adducts of organic compounds containing a non-aromatic C=C linkage, the method of improving the sulphitation product which comprises subjecting the sulphitation product in an aqueous phase containing at least 25% by weight of solids and an emulsion breaker of the group consisting of water-soluble alcohols, ketones and ethers, normally boiling below 125° C., to extraction with a non-aromatic hydrocarbon liquid normally boiling between 50° and 150° C., the amount of the emulsion breaker being between ½% and 8% by weight of the aqueous sulphitation product but less than sufficient to create a third liquid phase during the extraction.

5. In the manufacture of surface active agents by sulphitation of nitrosyl halide adducts of organic compounds containing a non-aromatic C=C linkage, the method of improving the sulphitation product which comprises subjecting the sulphitation product in an aqueous phase containing at least 25% by weight of solids and an emulsion breaker of the group consisting of water-soluble alcohols, ketones and ethers, normally boiling between 65° and 125° C., to continuous countercurrent extraction with a non-aromatic hydrocarbon liquid normally boiling between 50° and 150° C., the amount of the emulsion breaker being between ½% and 8% by weight of the aqueous sulphitation product but less than sufficient to create a third liquid phase during the extraction.

6. The method of improving an organic nitrosation-sulphitation product, which comprises mixing an aqueous nitrosation-sulphitation product containing between 25% and 40% of organic and inorganic solids in solution and a substantial proportion of high-boiling water-insoluble oils with between ½% and 8% by weight, but less than sufficient to form a third liquid phase, of a hydroxy-alkane having a normal boiling point between 75° and 85° C., and subjecting the mixture to extraction with a non-aromatic hydrocarbon extractant liquid normally boiling between 50° C. and 150° C.

7. In the manufacture of surface active agents by sulphitation of nitrosyl chloride adducts of olefinic compounds, the method of improving the sulphitation product which comprises mixing the sulphitation product in an aqueous phase containing between 25% and 40% of organic and inorganic solids in solution and a substantial proportion of high-boiling water-insoluble oils with between ½% and 8% by weight, but less than sufficient to form a third liquid phase, of a hydroxy-alkane having a normal boiling point between 75° and 85° C., subjecting the mixture to countercurrent extraction with an acyclic hydrocarbon extractant liquid normally boiling between 50° C. and 150° C., and subsequently vaporizing residual extractant from the aqueous sulphitation product.

8. In the manufacture of surface active agents by sulphitation of nitrosyl chloride adducts of olefinic compounds, the method of improving the sulphitation product which comprises mixing the sulphitation product in an aqueous phase containing between 25% and 40% of organic and inorganic solids in solution and a substantial proportion of high-boiling water-insoluble oils with between ½% and 8% by weight, but less than sufficient to form a third liquid phase, of a ketone having a normal boiling point between 75° and 85° C., subjecting the mixture to countercurrent extraction with a non-aromatic hydrocarbon extractant liquid normally boiling between 50° and 150° C., and subsequently vaporizing residual extractant liquid from the aqueous sulphitation product.

9. The method of improving organic nitrosation-sulphitation products, which comprises mixing an aqueous sulphitation product containing between 25% and 40% of organic and inorganic solids in solution and a substantial proportion of high-boiling water-insoluble oils with between ½% and 8% by weight, but less than sufficient to form a third liquid phase, of isopropyl alcohol, subjecting the mixture to countercurrent extraction with between 1 and 3 times its volume of an acyclic hydrocarbon extractant liquid normally boiling between 50° and 150° C., and subsequently vaporizing residual extractant from the aqueous sulphitation product.

WILLIAM ALFRED FESSLER.